Jan. 20, 1953 P. BIBKO 2,626,017
AUTOMATIC CRANKCASE OIL FEED DEVICE
Filed Aug. 28, 1950
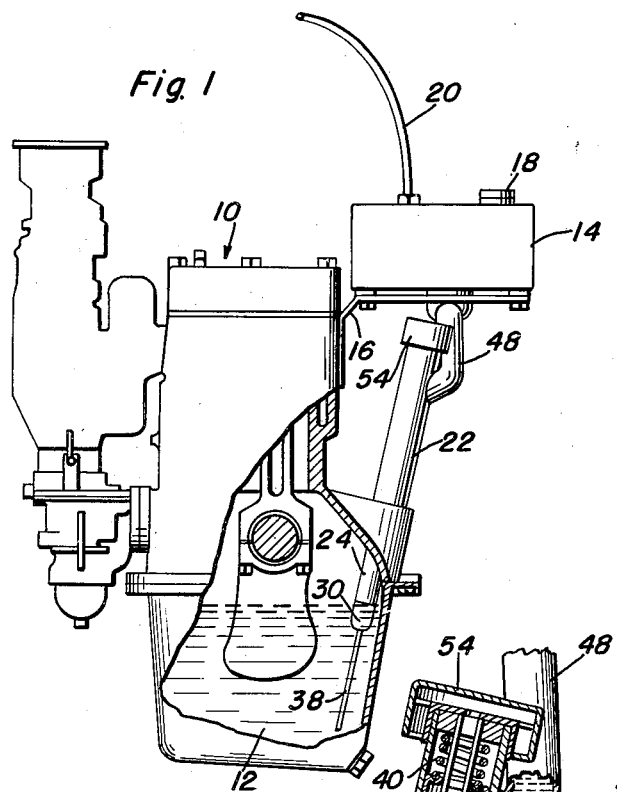
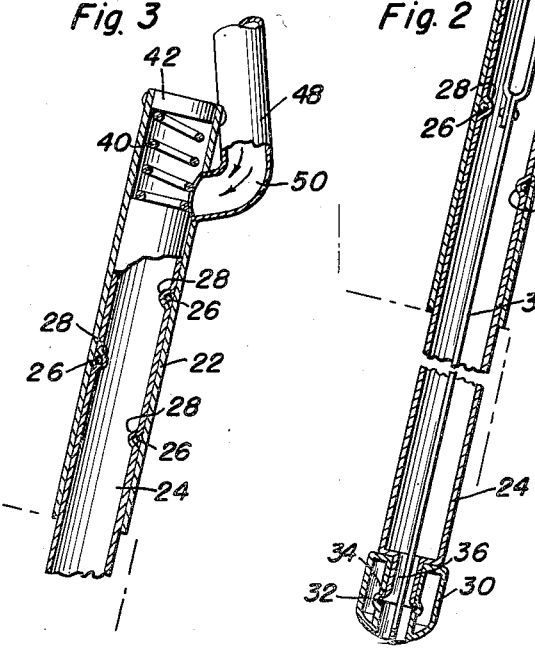
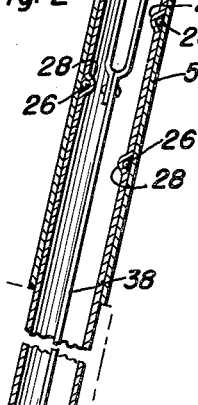
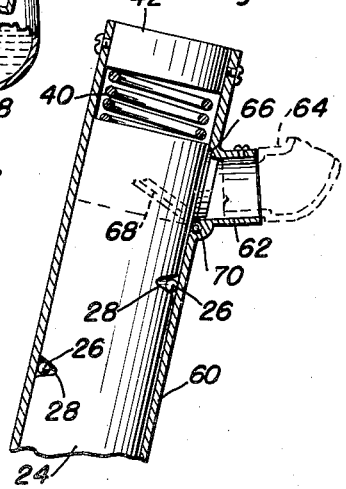
Peter Bibko
INVENTOR.

Patented Jan. 20, 1953

2,626,017

UNITED STATES PATENT OFFICE 2,626,017

AUTOMATIC CRANKCASE OIL FEED DEVICE

Peter Bibko, Yonkers, N. Y.

Application August 28, 1950, Serial No. 181,880

2 Claims. (Cl. 184—103)

This invention relates to improvements in attachments for engines of vehicles.

An object of this invention is to provide an assembly for automatically introducing additional oil into the crankcase of an engine when there is need for it, that is, when the proper quantity of lubricant in the crankcase is not present.

Another object of this invention is to provide an improved assembly for indicating the amount of crankcase oil present, said assembly including a tube which is adapted to be attached in registry with the opening in the engine housing leading to the crankcase which accommodated the standard dip stick tube, the new tube having a member disposed therein with a float at the lower end thereof whereby visual indication of the amount of oil present in the crankcase may be obtained by simply viewing the position or location of the member which has the float thereon.

A further object of this invention is to use the vertically movable member as a valve to close a passage which connects the tube with a supply of auxiliary oil, whereby when the member is lowered due to depletion of the crankcase oil, additional oil will flow through the dip stick hole supported tube and into the crankcase.

Ancillary objects and features of importance will become apparent in following the description of the illustrated forms of the invention.

Figure 1 is an elevational view of a standard engine with portions shown in section, and having the improvement attached thereto;

Figure 2 is a fragmentary sectional view of one form of the attachment;

Figure 3 is a fragmentary sectional view of a modified form; and

Figure 4 is a fragmentary sectional view of another form of the invention.

As disclosed in Figure 1 there is a standard engine 10 with a crankcase 12 containing ordinary crankcase oil. A container 14 is attached to the engine by means of a mounting bracket 16 which is secured by suitable means to the engine. The mounting bracket may be attached to any vehicle component found convenient, not necessarily to the engine 10.

A visual indicator 18 schematically shown and of standard construction is attached to the tank or container 14, and there is a line 20 in communication with the tank leading to the dashboard or other part of a vehicle in the interior thereof so that the quantity of oil in the container 14 may be indicated.

As disclosed in Figure 3 there is a tube 22 which connects with the opening normally holding the dip stick of an engine. This tube has a sleeve 24 slidable therein and a number of bearings 26 insure proper sliding movement of the sleeve 24 in the tube 22. These bearings are carried in pockets 28 formed in the sleeve.

The lower end of the sleeve or vertically movable member 24 is provided with a float 30 which is arranged to float upon the crankcase oil. This float has a groove 32 formed therein into which the flange 34 at the lower reduced end of the sleeve 24 seats. This holds the float 30 assembled with the sleeve 24. A passage 36 is provided in the float to allow the standard dip stick 38 to pass therethrough.

A spring or other yielding means 40 is disposed between the upper end of the sleeve 24 and the collar 42 which is fixed within the tube 22. A transparent panel may be carried by the collar if found desirable in order that vision may be had inwardly of the tube 22. The function of the spring 40 is to press the sleeve 24 downwardly slightly so as to insure that the sleeve will not stick in an up position. However, the spring 40 is not sufficiently heavy to press the float 30 objectionably far into the lubricant within the crankcase, inasmuch as this would result in false and improper readings.

The tank or container 14 is connected in registry with the tube 22 by means of the conduit 48 which has an oil passage 50 therein. The conduit is arranged in registry with an opening in one side wall of the tube 22, whereby when the sleeve 24 is lowered the oil will flow through the sleeve and into the crankcase. But, when the crankcase is full, that is, when the float 30 is elevated, the side wall of the sleeve 24 closes the opening in the side wall of the tube 22.

The tube 22 with its spring and sleeve may be used with or without the conduit and tank 14.

Reference is made now primarily to Figure 2 wherein there is the distinction that the standard dip stick 38 being attached at its upper end to a cap or closure 54 is employed. This dip stick may be used, if found desirable, but it is not necessary, the illustration of Figure 2 showing that the standard dip stick tube 58 may be modified to the extent of accommodating the sleeve 24 by simply making an aperture in the side thereof and connecting the conduit 48 to it.

Attention is now invited primarily to Figure 4 wherein the tube 60 is provided with a coupling 62 which extends laterally therefrom and which is adapted to connect to the conduit 64 serving the same purpose as the conduit 48. In this instance there is a valve seat 66 arranged at the junction of the coupling 62 and the tube 60. A valve 68 is hingedly connected for disposition on this valve seat to open and close the opening at the inner end of the coupling 62. The valve 68 is mounted on a hinge pin 70 for swinging movement inwardly of the tube between coils of the spring 40 to open it and along side of the side walls of the sleeve 28 for closing the valve.

In operation controlled quantities of auxiliary oil from the container 14 are simply introduced through the tube 22 or the tube 58 into the crankcase when it is necessary, as determined by the amount of oil present in the crankcase.

Having described the invention, what is claimed as new is:

1. In an internal combustion engine crankcase having a tube opening into the crankcase, an axially movable sleeve disposed in said tube and having a float at its lower end for raising and lowering the sleeve in response to the quantity of oil in the crankcase, mechanical means contacting said sleeve and yieldingly biasing said sleeve in opposition to the upward movement thereof, said tube having an opening in the side wall thereof, the side walls of said sleeve constituting a valve for said opening, a conduit opening into said opening and having an auxiliary oil supply tank connected therewith for gravity flow through said opening.

2. In combination with an engine crankcase oil fill tube which is provided with a lateral opening, an attachment comprising a valve operable in said tube, said valve having an open upper end and an open lower end to provide a passageway for adding oil to the crankcase, said valve being operable to open and close said lateral opening, a float located at the lower end of said valve and having a passage therethrough to receive a standard dip stick, a spring reacting on said tube and said valve respectively yieldingly opposing movement of said valve in one direction and providing a yielding stop for said valve, and means located between said valve and the inner surface of said tube for facilitating relative movement between said valve and said tube.

PETER BIBKO.

REFERENCES CITED

The following references are of record in the file of this patent:

UNITED STATES PATENTS

| Number | Name | Date |
|---|---|---|
| 1,289,893 | Peterson | Dec. 31, 1918 |
| 1,883,202 | White | Oct. 18, 1932 |

FOREIGN PATENTS

| Number | Country | Date |
|---|---|---|
| 40,665 | Denmark | Aug. 12, 1929 |
| 196,479 | Great Britain | Apr. 26, 1923 |